Feb. 13, 1968   N. P. STOATE ET AL   3,368,676
APPARATUS FOR DETECTING THE PRESENCE OF FOREIGN
BODIES IN TRANSPARENT CONTAINERS
Original Filed March 8, 1965   6 Sheets-Sheet 1

Inventors
NORMAN P. STOATE
CHARLES R. EDWARDS By *Imirie & Smiley*
Attorneys

Feb. 13, 1968   N. P. STOATE ET AL   3,368,676
APPARATUS FOR DETECTING THE PRESENCE OF FOREIGN
BODIES IN TRANSPARENT CONTAINERS
Original Filed March 8, 1965   6 Sheets-Sheet 4

*Fig. 7.*

Inventors
NORMAN P. STOATE
CHARLES R. EDWARDS

By *Smisie & Smiley*
Attorneys

Fig. 8.

United States Patent Office 3,368,676
Patented Feb. 13, 1968

3,368,676
APPARATUS FOR DETECTING THE PRESENCE OF FOREIGN BODIES IN TRANSPARENT CONTAINERS
Norman Parker Stoate, 8 Spencer Drive, Hampstead Garden Suburb, London, N. 2, England, and Charles Richard Edwards, 8 Herons Forde, St. Stephens Road, Ealing, London, W. 13, England
Continuation of abandoned application Ser. No. 437,901, Mar. 8, 1965. This application Feb. 6, 1967, Ser. No. 614,361
9 Claims. (Cl. 209—111.7)

This application is a continuation of our former application, S.N. 437,901, filed Mar. 8, 1965, now abandoned.

This invention relates to apparatus for detecting foreign bodies, which may be opaque and are of a predetermined minimum size of 0.3 in. across, in transparent containers such as for example milk bottles.

Hitherto transparent containers such as milk bottles have been checked for the presence in them of foreign bodies such as glass chips and dirt so that the contaminated container could be rejected from the bottle feed line and such checking has been carried out on full as well as empty bottles.

The known method of checking such containers is to pass them along a track on which they are supported and beneath which there is a light sensitive device such as a photo-electric cell, while a source of light is disposed above the containers to direct a beam of light onto the cell. Between the cell and the container there is a mask having an aperture or apertures or a radial slit therein so shaped and disposed that the bottle passing over it, and in some cases rotating on its own axis over the aperture or apertures, has the whole of its bottom scanned by the photo-electric cell. If there is a foreign body in the path of the light beam then this will interrupt the beam when the body obscures the aperture thereby causing the cell to initiate a signal which can be used to trip a mechanical ejector device in the feed line of the bottles, so that the contaminated bottle is rejected from the feed line of containers.

Such known apparatus necessitates the use of the apertured mask and of a concentrated beam of light in order to scan the whole bottom of the container and necessitates very accurate adjustment including adjustment of the light beam focus and its direction; the movement of the containers is effected by mechanical means such as star wheels which must be operated in timed relation with the movement of the mask. The speed of modern bottle filling machinery results in such apparatus being unable to check the bottles in succession fast enough to keep pace with the filling and capping machinery of a dairy.

In more recent years the bottles have been capped by metal foil caps which are discarded by the user and it frequently occurs that bottles returned empty to dairies have the caps inside them and these do not always become dislodged from the bottles in the bottle washing apparatus. The bottles have to be checked before filling for the presence of such caps and other particles of 0.3 in. diameter or greater.

The main object of the present invention is to provide an apparatus whereby transparent containers such as milk bottles may be checked for the presence therein of particles of a minimum size as herein defined.

The invention is based on the novel principle of disposing the container on a group of light sensitive cells and illuminating all the cells through the container with strong diffused light, the cells when illuminated being inactive, but when the light on at least one of them is reduced by a foreign body in the container such cell or cells will initiate a signal which can be employed to indicate the presence of the foreign body: the reduction in the light reaching a cell can be caused in several ways such as by a shadow cast by the foreign body or by refraction of light rays passing through a transparent body such as a glass chip. Depending on the distance between the cells, the area of the sensitive parts of the cells facing the container bottom, the distance between the light source and the cells, and the minimum distance between a foreign body and the cells (i.e. the thickness of the container bottom at the worst), the minimum size of foreign body which can be detected can be calculated. Thus for a given minimum particle size of at least 0.3 in. across to be detected, e.g. the area of a sixpenny piece, the number of cells and their spacing can be calculated. Another feature which affects the size and spacing of the cells is the minimum area of each cell which must be starved of light to initiate the signal.

According to the present invention an apparatus for detecting foreign bodies in transparent containers of similar shape, such as milk bottles, comprises a track along which the containers travel, a group of light sensitive cells disposed beneath the container bottoms as they travel along the track, a diffused light source located above the containers so as fully to illuminate all the cells and the whole of each container interior as it passes over the cells, the light source being of such intensity and diffusion that a foreign body in a container will reduce the illumination of at least one cell sufficiently so that said cell will initiate a signal for indicating the presence of the foreign body in the container, and means to prevent any signal emanating from any cell as the walls of the containers traverse the group of cells.

Preferably the track comprises a series of freely rotatable rollers, disposed transversely of the direction of travel of the containers between upstanding retaining means such as wall-like strips and the cell or cells are disposed between two rollers across the track having their surfaces close to the bottoms of the containers as they pass thereover while the light source comprises a powerful diffusion illuminating electric lamp disposed above the containers. The track forms a loop from and back to a travelling conveyor so that the containers fed by the conveyor push the containers in front of them along the loop track so that the containers do not have to be driven by a moving track or other mechanical means as they pass over the cells.

The cells are arranged beneath the containers but uninterrupted by the track and sufficient in number to ensure that when a contaminated container having a minimum sized detectable particle therein traverses the cells, the light reaching the cells from the light source will be reduced sufficiently by the particle for the cells to initiate the indicating signal. Switching means are provided to disconnect the cells from the indicating apparatus as otherwise when the walls of the containers pass over the cells there will be a reduction in light reaching the cells sufficient to initiate the signal.

In one preferred construction known as the "single arc" construction, the cells are disposed in a semi-circle across the track so that when a container is disposed immediately above them, the arc of cells convex to the oncoming containers will be disposed around the inside of the bottom of the wall of the container. The cells are arranged with an equal number on either side of the center line of the track, and starting from the outside pair, the pairs are in circuit with operating cells downstream of the arc cells, such that if a cell of a pair of arc cells is dimmed by a foreign body it will signal its operating cell and when the leading edge of the bottle passes over the alerted operating cell, that cell will initiate a signal to cause the ejector to eject that bottle. A main control cell is provided in the arc so that, when a bottle wall passes over it, it signals all cells to be inoperative and when it is reilluminated through a bottle bottom it resets the arc cells.

In an alternative construction known as the "double arc" construction, two arcs of cells are employed disposed transversely of the track each similar to the single arc and employed back to back, i.e. their convex faces close together on the center line of the track.

In a third preferred construction known as the Z construction, the cells are disposed in line across and perpendicular to the center line of the track.

The cells are preferably silicon planar photo-transistors of the type marketed under the designation Fairchild "2N986."

In order that the invention may be more clearly understood some embodiments in accordance therewith will now be described by way of example with reference to the accompanying drawings, in which.

Figure 1:
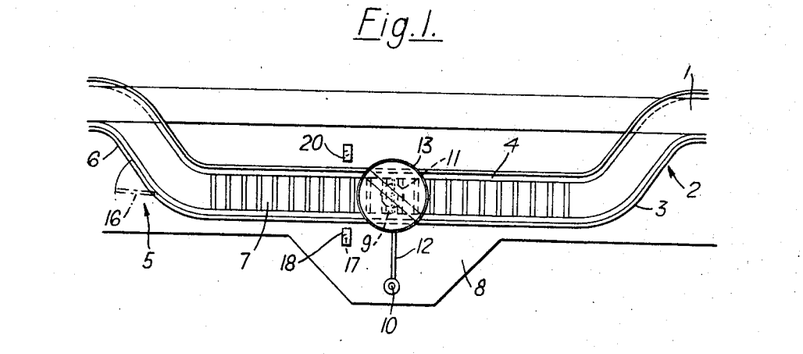
FIG. 1 is a plan view of a milk bottle checking apparatus.
Figure 2:
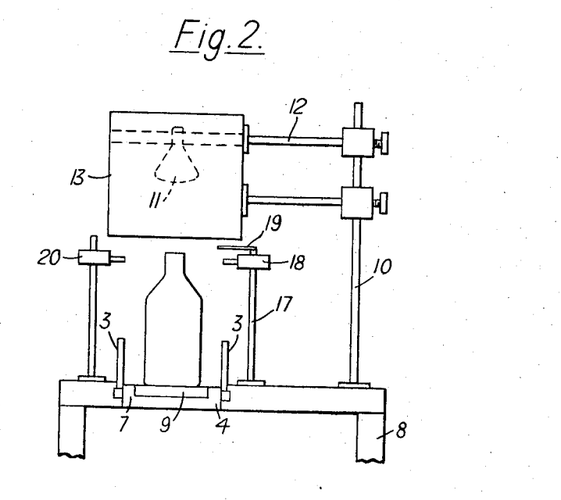
FIG. 2 is a cross-section along the line II—II of FIG. 1 looking in the direction of the arrows, the scan cells in FIGS. 1 and 2 being arranged in the Z construction.

Referring to FIGS. 1 and 2, the bottles are driven along a driven conveyor track 1 such as a travelling belt on which the bottles stand, guards 2 being provided along the track to prevent the bottles toppling off the track. At 3 a loop track 4 leaves the track 1 and after passing the checking and ejector devices (to be described), the loop track runs back into the track 1 at 5; curved guards 6 ensure that the bottles move onto and off the loop track 4. By reason of the drive to the bottles on track 1, the bottles push each other from behind along the track 4. By such a feed the bottles can travel rapidly through the apparatus e.g. at 400 per minute.

The track 4 is formed of freely rotatable anti-friction rollers 7, e.g. of fluon or nylon, journalled preferably in anti-friction bearings in the frame 8 so as to be close to one another; they are across the track at right angles to the center line and of such a diameter, e.g. 1 inch, that the bottles will always rest on at least two rollers and will not therefore tip over. Guard rails 8 run along the track 4 to keep the bottles on the track. Fluon or nylon rollers 7 have the added feature that they clean the bottle bottoms as they are rotated by the bottles passing over them.

At the checking point a group of light sensitive scan cells 9, e.g. silicon photodiodes, are set in line across and at right angles to the center line of the track 4, the cells being between and close to two adjacent rollers 7, so that the air space above them is uninterrupted except when a bottle passes. The upper surface of the group of cells is substantially in the plane of the tops of the rollers 7 but just sufficiently below that plane to prevent the bottle bottoms touching the cells.

A pillar 10 on the frame 8 supports a lamp 11 which constitutes the light source for illuminating the cells through the bottles in succession. The bulb is a 150 watt spotlight with a silvered back and having a front diffuser lens which ensures intensive diffused illumination of the cells, and gives a slightly diverging series of rays, the full zone of intensity of light extending beyond the sides of the track 4. The central zone of the bulb faceplate may be masked as by a band of aluminum sheet or foil extending parallel to the cell group across the track 4, for the purpose to be described. The lamp is carried on a bracket 12 adjustable on the pillar 10 and clamped thereon by any suitable means, so that the lamp may be adjusted in height above the track 4, and this adjustment, which has a wide tolerance of allowable distance from the track 4, is the only adjustment which the operator has to make.

The lamp is surrounded by a shield 13 to prevent glare to the operator and to assist by reflection the illumination of the cells and bottle interior.

As will be explained an ejector device indicated at 14 is provided to eject contaminated bottles onto a discard table 15 through a gate 16. This ejector device forms no part of the present invention and requires no further description here. The ejector must be located beyond the cells to enable the ejector device to remove a bottle after a contamination has been detected. To operate the ejector a device 17 is provided which is triggered when the cells have triggered and is reset by a subsequent bottle. The device 17 comprises a light source, e.g. a lamp in a holder 18 shielded from the lamp 11 by a shade 19, and directing a light beam onto a light sensitive cell 20, the holder 18 and cell 20 being supported above the track 4 at such a height that the necks of the bottles will interrupt the light beam to the cell 20 as they move along the track 4, for the purpose to be explained. The neck being of small diameter provides the size of blanking pulse required to operate the ejector.

Figure 3:
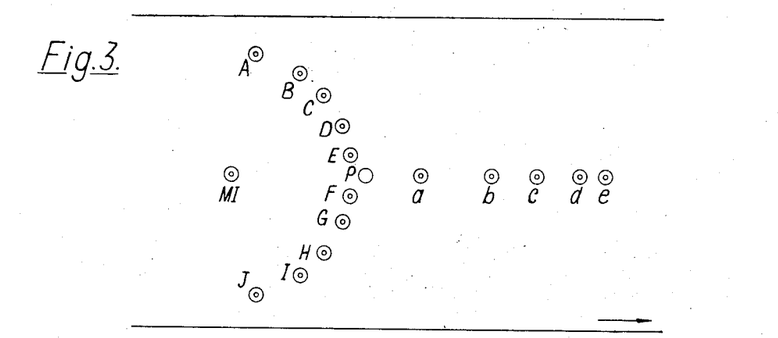
FIG. 3 shows diagrammatically a plan of the "single arc" construction of scan cells.

Referring now to FIG. 3 this shows diagrammatically the single arc construction, the track 4 being shown in outline only and the group of cells 9 being shown as five on each side of the center line of the track; the cells are marked A–E and F–J on opposite sides of the center line, so that they operate in pairs EF, DG, CH, BI, and AJ. There is a central cell P slightly downstream of the arc and a series of cells $a$ to $e$ downstream in the bottle line of the cell P and all in the center line of the track. The radius of the arc of cells, i.e. to the outer sides of the cells, equals or is slightly greater than the radius of a bottle bottom within the bottle walls so that when the bottle is centered on the arc the cells all lie just inside the walls of the bottle—assuming a circular bottle.

It will be apparent that in this disposition of the bottle with the cells in action and the lamp 11 illuminated, the cells will not initiate signals if the bottle is uncontaminated but if a foreign body is in the bottle as it is scanned, it will cause reduction of the illumination of one or more cells which will then initiate a signal. Since the cells will thus react to the presence of a transparent foreign body due to refraction of the light rays from the cells, the same triggering of the cells will occur when the glass walls of the bottle cross the cells and hence some switching means is necessary to prevent such a signal emanating from the cells.

Assume a bottle moves along the track 4 from left to right and ignore cell MI. When the leading bottle edge covers the cell P this renders all the cells inoperative, but when P is reilluminated as the bottle wall leaves it the cells A–J are caused to be operative, but the cells $a$ to $e$ remain inoperative. If a foreign body in the bottle now covers cell A or J this covered cell sends a signal to make cell $a$ operative and when the leading edge of this bottle passes over $a$ the latter initiates a signal to the ejector which when the contaminated bottle reaches it will eject the bottle. When the trailing edge of the bottle passes over the cells A and J they will cause $a$ to be operative, but since the leading bottle wall has been passed $a$ and P has been covered by the trailing bottle wall this will render *a* inoperative and it does not become operative until A and J are again set by P becoming light after being crossed by the leading edge of the succeeding bottle. The cell P when light allows cells A–J to be operative and when P is dark all cells A–J and *a* to *e* are rendered inoperative. *a* and *e* are only made operative by one of cells A–J being obscured. Similarly the cells BI, CH, DG and EF cooperate with the cells *b, c, d* and *e* respectively so that the whole bottle is scanned and will eject any bottle with any foreign body anywhere in it. If there is a foreign body covering the major portion of the bottle bottom, a cell MI is alerted by the cell P when darkened and MI then sends a signal to the ejector to eject the bottle.

Figure 4:
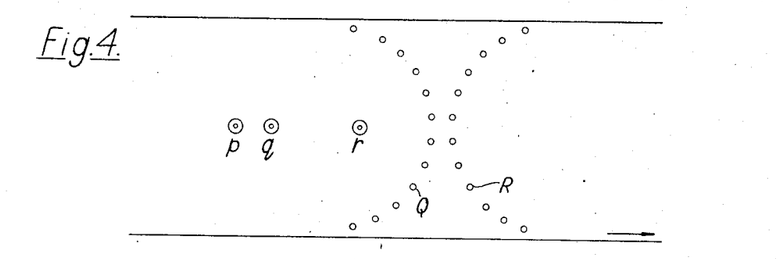
FIG. 4 shows diagrammatically a plan of a "double arc" construction of scan cells.

Referring to the "double arc" construction in FIG. 4 there are three cells *p, q, r* in the center line sited to operate as follows, the arcs being marked Q and R.

In operation when the cell *p* is covered by a bottle wall this sends a signal through a circuit which renders the cells R inoperative; when the bottle wall covers cell *q* this sends a signal which renders the cells Q operative, the cells R remaining inoperative; while the bottle wall covers cell *r* this sends a signal which renders cells R operative and the cells Q inoperative. Now assuming the bottles move from left to right in FIG. 4, the cells *p, q, r* and the cell Q nearest the center line, being spaced apart by distances of half a bottle. When the trailing wall of a bottle covers cell *p* this is dimmed and sends a signal which renders the cells R inoperative after scanning the trailing half of the previous bottle in the line. When the trailing edge of the bottle covers cell *q* this sends a signal to render cells Q operative and the leading half of this bottle bottom is scanned by cells Q as it moves over them; when the trailing bottle wall covers *r* this sends a signal which renders cells R operative and cells Q inoperative and the cells R scan the trailing half of this bottle bottom and are turned off by the trailing edge of the succeeding bottle as it covers *b*. Thus each arc Q and R scans half a bottle bottom and the trailing edges if the bottles cover the cells *p, q, r* to cause the cells Q and R to be operative and inoperative in accordance with the aforesaid sequence. If as a bottle is scanned by Q or R, there is a foreign body in the bottle any of these cells dimmed thereby will initiate a signal to cause actuation of the ejector as will be explained.

Referring to FIG. 2 this shows the Z or Zero Logic Construction which has no switching logic. In this case the cells are arranged in line across the track 4, and may be paired on opposite sides of the center line of the track. The number of cells is determined by the size of the bottle.

This system differs from the others in that it employs optical means to avoid edge effects and the cells are on all the time.

The cells in circuit all the time are arranged in a straight line across the track and lighting is arranged so that no matter where the container is, every cell always receives sufficient light not to be triggered. An opaque particle will still cause triggering. The performance of the apparatus can be raised if the cells are electrically blanked while the two center cells have two adjacent bottle walls above them. (The point of minimum light.) This means that the general light level can be reduced and, therefore, the sensitivity raised. This blanking signal can also be used to ensure that the rejection signal from a previous bottle is only passed to the rejection mechanism when the container in question is in a fixed and previously arranged position relative to it.

The two cells nearest the center of the track do receive a larger reduction in illumination per bottle than the other cells. This occurs when the center cells are positioned directly under the point of contact between two bottles. This effect does not occur with cells away from the center unless square bottles are used, when it will occur simultaneously with all cells. This effect can be overcome either by increasing the overall illumination, or by electrically blanking the output from the whole set of cells at this critical point. If the second, i.e. blanking method is used, it enables the illumination to be reduced, thereby greatly raising the sensitivity of the apparatus. It also means that the apparatus is less critical in its settings and not so sensitive to changes in illumination, although it does involve the introduction of some simple logic circuitry.

Whichever construction is used the signal from the checking cells, i.e. arc or straight line, is passed to means for ejecting the bottle from the feed line.

Most known mechanical rejection systems require a signal to reject a faulty container when the latter is in a critical physical relationship with the rejector. If the rejection signal is fed straight to the rejector as it occurs, the rejector can operate at entirely the wrong time, causing a jam to occur between several containers and itself. If, however, the rejection signal is stored in a suitable memory and then fed at the correct instant to the rejector, the latter will remove the faulty container from the line without undue disturbance. The memory will be called a "particle memory" in this description. A signal which is only fed to the rejector when the container is in the correct position for rejection, will be called a "unique signal." This is easily produced by directing a beam of light across the bottle track on to a light sensitive cell (the unique signal cell), and arranging the physical characteristics of the system so that the neck of the bottle just breaks the beam at the moment when the scanning of the container is complete: this apparatus is formed by the lamp and cell 20 in FIGS. 1 and 2.

If this unique signal is used to reset the particle memory and hold it reset while the beam is broken, then the cells are in effect blanked without any complicated arrangements, the neck of the average bottle being of the correct width to achieve this. It can also easily be arranged that the action of resetting the particle memory, triggers a secondary memory, which holds the output relay energized until the mechanical rejector has had time to respond. This will obviously not occur if the particle memory is not triggered in the first place and so the signal fed to the secondary memory is in fact a unique signal. The secondary memory can be reset with the aid of a microswitch operated by the container as it is rejected.

In very high speed milk bottle filling lines, it may be found that if two adjacent bottles are faulty, the second one may not be rejected because of the limitations regarding speed of operation imposed by the mechanical rejection system. This is overcome by arranging that the reset pulse for the secondary memory should not occur if a second fault is detected.

The circuit settings that occur when two adjacent containers are faulty, are that both memories are in a triggered condition at the same time, i.e. set in the opposite state to reset. This cannot occur for any other reason because the resetting of one normally triggers the other, thereby ensuring that their conditions are opposite. Therefore, it is arranged that when both memories are in the triggered condition together, an additional circuit detects this situation and blanks out the reset pulse from the rejection detecting micro-switch. As soon as the particle memory has been reset for the second time, then the next micro-switch pulse resets the secondary memory, closing the rejection gate.

This can occur for any number of faulty bottles in a row and there must be at least one bottle diameter between the detection and rejection points due to the comparatively slow response of the rejector mechanism. This gap ensures that if a second bottle is detected as being faulty, the particle memory will be re-triggered, thereby blanking any reset pulse which might have been fed to the secondary memory, before the latter has been reset by the first faulty bottle. This ensures that the rejector gate remains open.

Figure 5:
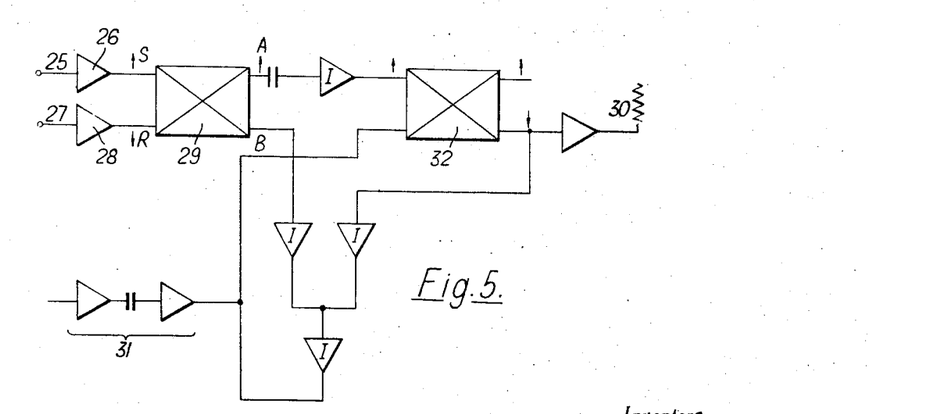
FIG. 5 shows the logic employed for using the signal from a scan cell or cells to operate an ejector device to remove a detected contaminated bottle from the feed line of bottles.

The logic necessary to achieve what has just been described is shown in FIG. 5.

In FIG. 5 the signal enters at 25 from the bottle checking cells and passes to an amplifier 26 which is a two stage amplifier in which the output OZ equals the input IZ. The unique signal enters at 27 and passes to a two stage amplifier 28 in which OU=IU. These two signals OZ and OU are fed into a particle memory 29 such that S=A=−B, R=−A=B, and S+R=−A=−B. In the diagram, the letter I indicates a single stage inverter, where the output is the reverse of the input, i.e., 180° out of phase or A=−B. In this circuit the relay 30 is closed when the input is zero or of negative notation. The device 31 is a pulse shortener with a normal output of −B but with an input of A the output changes to +B for a short time.

The part shown is the logic network which is incorporated and is that used to cause blanking of the reset pulse when both memories are in the triggered condition. It will be noted from the diagram that two of its inputs are taken from points on each memory respectively that exhibit ZERO output when that memory is in the triggered condition. This ensures that the combined output, which is fed to the second stage of the logic, is only "1" when BOTH memories are in the triggered condition.

The next stage of the logic, as can be seen, is an inverter, whose output is coupled to the output of the reset pulse shaper and amplifier. As its input is a "1" when both memories are in the triggered condition, it inverts this signal and blanks the pulse as is required.

It should be noted that this logic is not part of the Z system but merely makes up for the limitations on speed inherent in any mechanical system.

The circuitry is constructed on three decks of Veroboard printed circuitry.

Figure 6:
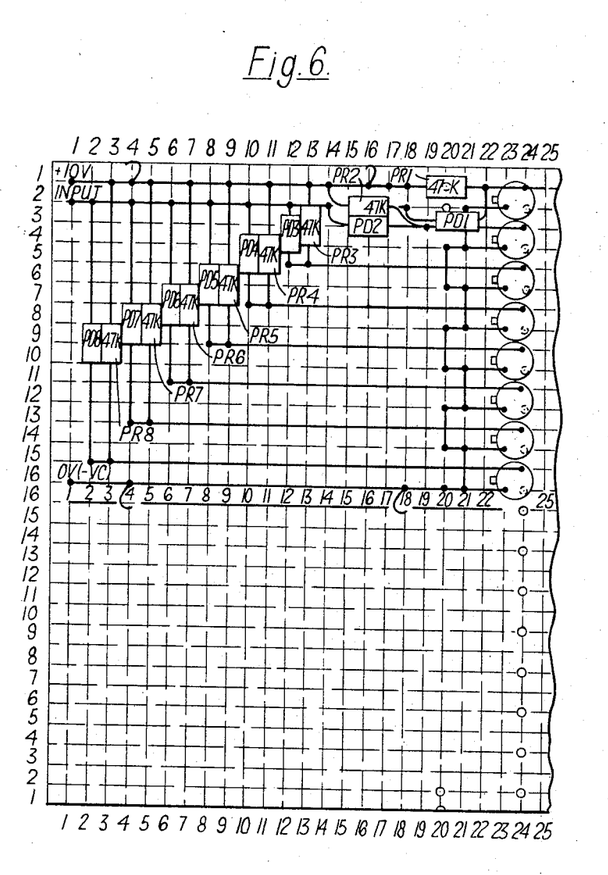
FIG. 6 shows the electric circuit of a Z construction operating a bottle ejector, the cells and their associated diode/resistor network only being shown.

Deck No. 1 contains the sensing Z system cells and their associated diode/resistor network. The layout is shown in FIG. 6.

Figure 7:
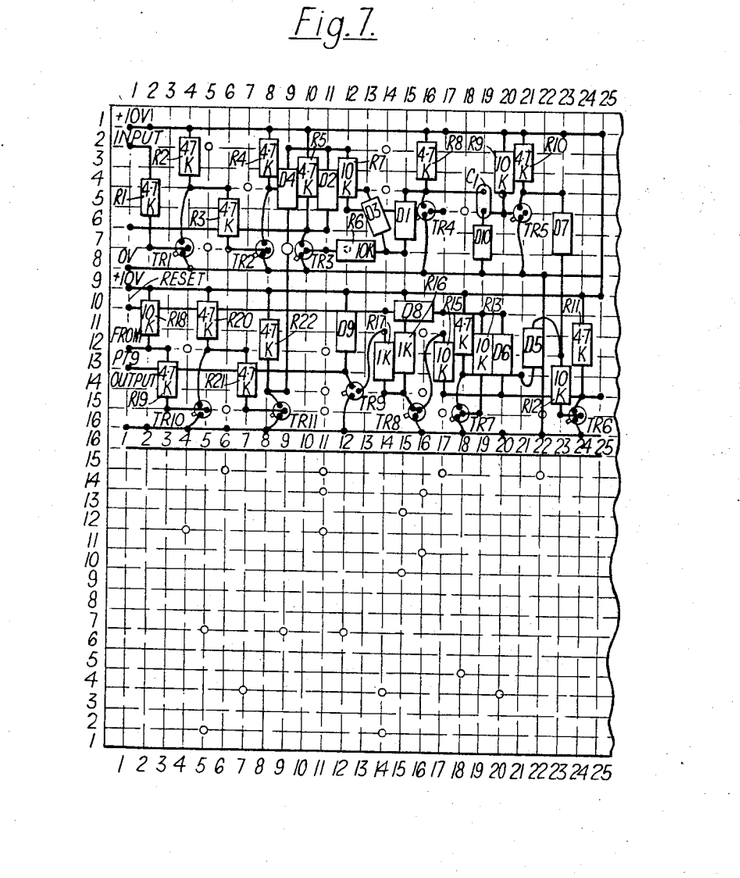
FIG. 7 shows the electric circuit of the memories and their coupling circuits as well as the Z cell amplifier and the output amplifier.

Deck No. 2 contains both memories and their coupling circuits, as well as the Z cells amplifier and the output amplifier. The layout is shown in FIG. 7.

Figure 8:
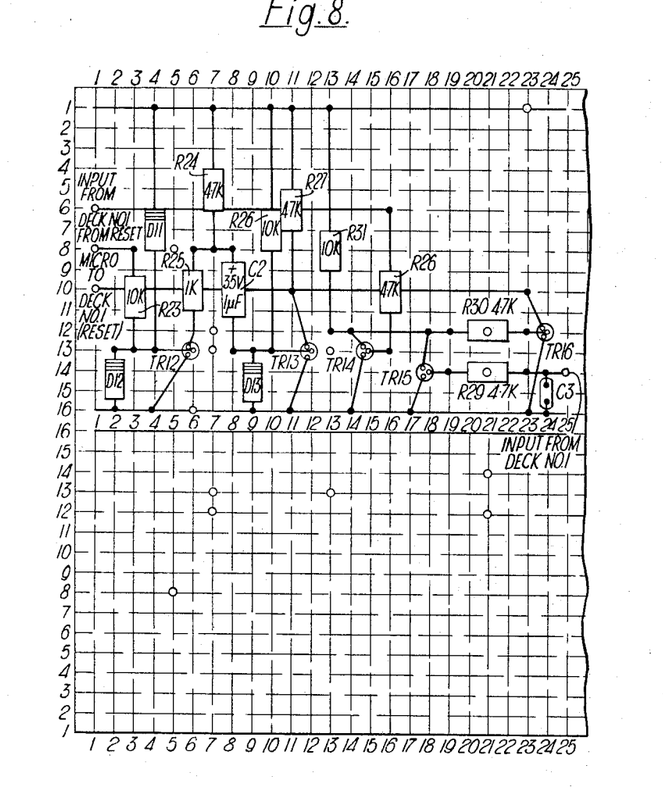
FIG. 8 shows the electric circuit of the reset microswitch pulse shaper and amplifier and the logic network for blanking this pulse; the circuits of FIGS. 6–8 are disposed one above the other, that of FIG. 6 being on top, on a three deck Veroboard printed circuit.

Deck No. 3 contains only the reset micro-switch pulse shaper and amplifier and the logic network for the blanking of this pulse, when required is as already described. The layout is shown in FIG. 8.

Figure 9:
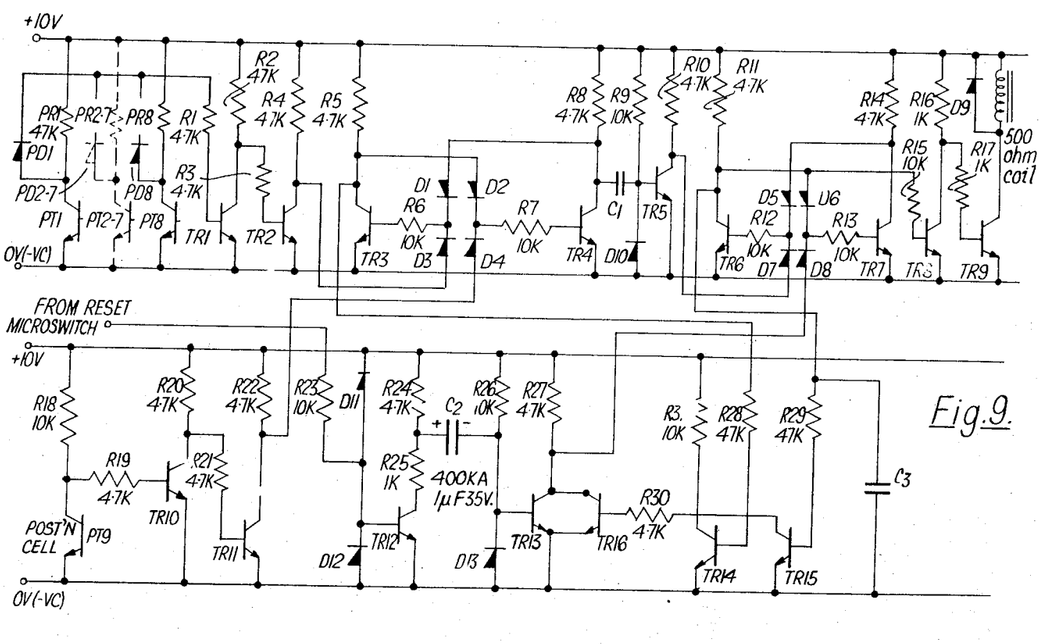
FIG. 9 shows the whole electronic circuit employing MPR devices throughout.

The circuit is shown in FIG. 9 showing the whole electronic circuit of the system, which employs NPN planar devices throughout.

(a) *The sensing system.*—This employs P.T.1–P.T.8 which have their collectors bottomed when light shines on them. They are silicon planar phototransistors type 2N986. The load resistors employed are 47 Kohms (PR1–PR8). If the light is blocked from any one or more of these phototransistors, the voltage across it rises, this rise being transferred to the base of TR1, the first stage of the Z amplifier, by one of the "PD" isolating diodes and R1. The "PD" diodes isolate the phototransistors from one another.

TR1 (in common with all transistors in the circuit) is an A.E.I. planar epitaxial passivated NPN device, type PEP5 and serves as an inverter and first-stage amplifier to cut off TR2, which triggers the particle memory with a rising pulse.

(b) *The particle memory.*—This consists of TR3 and TR4 with their associated circuitry. A rising pulse from TR2 raises the voltage on the base of TR3 via D3 and R6, so causing this transistor to bottom, thereby taking the voltage on the base of TR4 below the latter's cut-off point, with the result that the voltage on the collector of TR4 rises and maintains the drive on the base of TR3 after the trigger pulse from TR2 has ended (via D1 and R6).

The purpose of the diode networks D1/D3 and D2/D4 is that the base of TR3 and TR4 should always receive the highest voltage available at the non-cathode end of the diode pairs D1/D3 and D2/D4. This is a conventional circuit and requires no further explanation here.

It will now be realized that the output from TR4, when the particle memory is in the triggered condition, is a "1" (approximately 7 volts). However, this has no effect on TR5, because the latter is already being driven by R9.

(c) *The unique signal.*—When a bottle neck passes PT9, the voltage across PT9 rises, bottoming the collector of TR10 so that a voltage of approximately 7 volts appears on the collector of TR11. This resets the particle memory TR3/TR4 via the diode D4 and D7.

The memory is now held reset while the neck of the bottle passes PT9, the position of PT9 being so arranged that the light is first blocked from it when the bottle in question has just reached the end of its useful scan area. When the neck has passed clear of PT9, the useful scan area of the next bottle is just starting, the neck having therefore held the particle memory reset, while the transition between two bottles occurs.

The action of resetting the memory causes a sharply falling voltage on the collector of TR4, always when the bottle is in the same position; the "unique" signal. This falling voltage cuts off the base of TR5 via C1, D10 being fitted to prevent the base of TR5 being taken more than 0.5 volt negative. (The forward voltage drop of D10.)

This all causes a sharp positive going pulse on the collector of TR5, which lasts until C1 has recharged via R9, when the voltage on the collector of TR5 falls again.

(d) *The secondary memory:* (32 in FIG. 7).—The sharp rising pulse on the collector of TR5 triggers the secondary memory formed by TR6 and TR7 via D7 and R12. This, in turn, causes the voltage across TR6 to fall, so cutting off TR7, across which the voltage then rises, holding TR6 bottomed via D5. Because TR6 is bottomed, TR8 is cut off via R15, so that TR9 is driven hard, pulling in relay. TR8 and TR9 therefore form the output relay amplifier.

(e) *Resetting the secondary memory.*—The particle memory (TR3/TR4) is now reset and the secondary memory is in the triggered condition. Because TR3/TR4 are in the reset condition, there is a voltage across TR3, which bottoms TR14 via R28.

This causes a low voltage across TR14, so cutting off TR16 via R30. If the reset micro-switch is now operated, TR12 cuts off TR13 (until C2 has recharged via R26, D13 being used to prevent the voltage across the base-emitter junction of TR13 going more than 0.5 volt negative), so causing a large pulse to occur on the collector of TR13, which as TR16 is cut off, is unaffected and so rests the secondary memory TR6/TR7 via D8 and R13, causing the relay to drop out.

If, however, with the secondary memory still in the triggered condition, another fault pulse had been fed into the particle memory, the voltages across both TR3 and TR6 would be low, these devices both being bottomed.

The result would have been both TR14 and TR15 would have been cut off, so that the voltage across them would have risen due to R31. This would have bottomed TR16, so that when the reset pulse appeared on the collector of TR13, it would have been blanked by the bottomed TR16, both these transistors sharing a common load: R27. Therefore the secondary memory would not have been reset, with the result that the gate would have been held open for two bottles.

The third (clean bottle) resetting TR3/TR4 (via PT9), would cause TR3 to cut off, bottoming TR14 and cutting off TR16, so returning the system to a condition in which to receive a normal "secondary memory reset pulse."

The purpose of R25 is to prevent the voltage across C2, which is a solid tantalum polarized electrolytic condenser, from reversing.

The purpose of C3 is to prevent a spurious high-frequency pulse being generated by the very powerful reset action and D11/D12 are to prevent spurious mains voltages from a damaged cable, say, destroying TR12.

In all the constructions described the bottles move over fixed cells with a fixed light source above them and the apparatus will function with high speed bottle feeds of for example 600 bottles per minute and effectively reject a single contaminated bottle or two or more contaminated bottles in succession or two contaminated bottles separated by a clean bottle, the clean bottle being retained in the feed line.

What is claimed is:

1. An apparatus for detecting foreign bodies in transparent containers of similar shape, comprising a track for the containers, a group of light sensitive scan cells beneath the container path, which path is over the track, means to cause the containers to move continuously in rapid succession on said track over said cells, a diffused light source above the track disposed to permit the containers to pass under it and fully to illuminate all the cells and each container interior passing under it, the intensity and diffusion of said light source being such that a foreign body in a container passing over said cells will reduce the illumination of at least one cell sufficiently to cause said at least one cell to initiate an indicating signal in a circuit, means responsive to said signal for actuating a bottle ejector device, and means operable as the container walls of each container pass over said cells to prevent said indicating signal from said cells due to said walls to cause actuation of said second named means.

2. An apparatus according to claim 1 wherein said cells are arranged beneath said containers uninterrupted by said track and sufficient in number to ensure that when a contaminated container having a minimum sized detectable particle therein traverses said cells, the light reaching said cells from said light source will be reduced sufficiently by said particle for said cells to initiate the said indicating signal.

3. An apparatus for detecting foreign bodies in transparent containers of similar shape, comprising a track for the containers, a group of light sensitive scan cells beneath the container path over the track, a diffused light source above the track disposed to permit the containers to pass under it and fully to illuminate all the cells and each container interior passing under it, the intensity and diffusion of said light source being such that a foreign body in a container over said cells will reduce the illumination of at least one cell sufficiently to cause said at least one cell to initiate an indicating signal in a circuit, means responsive to said signal for actuating a bottle ejector device, and means sensing the container walls as each container passes along said track and influencing said circuit to prevent an indicating signal from said cells due to said walls from causing actuation of said first named means, said cells being disposed in a semicircle across said track so that when a container is disposed immediately above them, the arc of cells convex to the oncoming containers will be disposed around the inside of the bottom of the wall of said container.

4. An apparatus according to claim 3 wherein said cells are arranged with an equal number on either side of the center line of said track, and starting from the outside pair, the pairs are in circuit with operating cells downstream of the arc cells, such that if a cell of a pair of arc cells is dimmed by a foreign body it will signal its operating cell and when the leading edge of said container passes over the alerted operating cell, that cell will initiate an indicating signal by which said container may be ejected.

5. An apparatus according to claim 3 wherein a main control cell is provided in said arc so that, when said container wall passes over it, it signals all cells to be inoperative and when it is reilluminated through a container bottom it resets said arc cells.

6. An apparatus for detecting foreign bodies in transparent containers of similar shape, comprising a track for the containers, a group of light sensitive scan cells beneath the container path over the track, a diffused light source above the track disposed to permit the containers to pass under it and fully to illuminate all the cells and each container interior passing under it, the intensity and diffusion of said light source being such that a foreign body in a container over said cells will reduce the illumination of at least one cell sufficiently to cause said at least one cell to initiate an indicating signal in a circuit, means responsive to said signal for actuating a bottle ejector device, and means sensing the container walls as each container passes along said track and influencing said circuit to prevent an indicating signal from said cells due to said walls from causing actuation of said first named means, two similar arcs of cells being disposed transversely of said track said arcs being disposed back to back, i.e. their convex faces close together on the center line of said track.

7. An apparatus for detecting foreign bodies in transparent containers of similar shape, comprising a track for the containers, a group of light sensitive scan cells beneath the container path over the track, a diffused light source above the track disposed to permit the containers to pass under it and fully to illuminate all the cells and each container interior passing under it, the intensity and diffusion of said light source being such that a foreign body in a container over said cells will reduce the illumination of at least one cell sufficiently to cause said at least one cell to initiate an indicating signal in a circuit, means responsive to said signal for actuating a bottle ejector device, and means sensing the container walls as each container passes along said track and influencing said circuit to prevent an indicating signal from said cells due to said walls from causing actuation of said first named means, wherein said scan cells are disposed in a straight line across and perpendicular to the longitudinal center line of said track.

8. Apparatus for detecting foreign bodies in transparent containers of similar shape comprising, in combination, means for continuously moving the containers along a predetermined path, a series of light sensitive members arranged transversely of and below said path and disposed in predetermined spaced relation corresponding to the minimum size of a foreign body to be detected, a diffused light source positioned above said light sensitive members for illuminating all of said light sensitive members as the containers pass along said path between the diffused light source and the light sensitive members, and means for detecting a predetermined reduction of illumination on any one of said light sensitive members.

9. Apparatus for detecting foreign bodies in transparent containers of similar shape, comprising a track for said containers, a group of light sensitive scan cells beneath said track, means to cause the containers to move continuously in rapid succession along said track over said cells, a light source above said track to fully illuminate all said cells and each container interior passing between the light source and said cells, the spacing between said cells and the intensity of said light source being such that a foreign body in a container passing over said cells will reduce the illumination of at least one cell sufficiently to initiate a reject signal, and means responsive to a reject signal to displace the container initiating such signal from said track.

No references cited.

ROBERT B. REEVES, *Primary Examiner.*

HADD S. LANE, *Examiner.*